Nov. 7, 1939.   A. T. MACE   2,179,472
ANTIRATTLING MEANS FOR TELESCOPICALLY EXTENSIBLE MEMBERS
Filed March 1, 1938
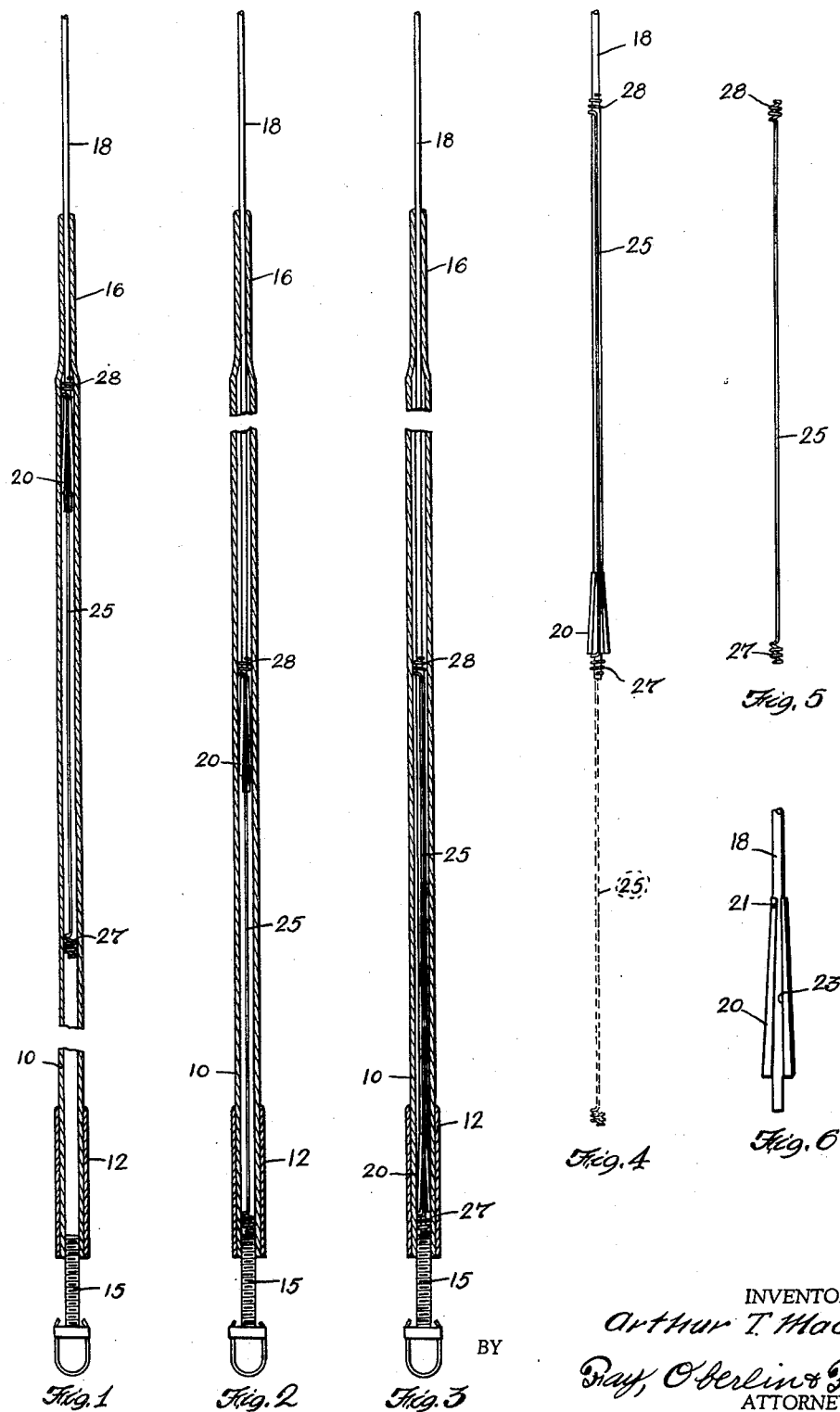
INVENTOR.
Arthur T. Mace
BY Bray, Oberlin & Bray
ATTORNEYS.

Patented Nov. 7, 1939

2,179,472

UNITED STATES PATENT OFFICE

2,179,472

ANTIRATTLING MEANS FOR TELESCOPICALLY EXTENSIBLE MEMBERS

Arthur T. Mace, East Cleveland, Ohio, assignor to The Radiart Corporation, Cleveland, Ohio, a corporation of Ohio Application March 1, 1938, Serial No. 193,270

9 Claims. (Cl. 287—58)

This invention pertains to telescopically extensible members adjustable for varying length and relates more particularly to automobile radio aerial systems which include a member fixed to the body and a second member telescopically mounted within the first member.

Devices of this class have acquired a wide commercial acceptance and in general have proved satisfactory as receiving mediums for automobile radios. For such use, ample clearance between the telescoping members is necessary to afford economy of manufacture. As a result there is a tendency for the two telescoping portions to rattle against each other, especially if the inner member is relatively flexible, as is usually the case. The noise resulting from such rattling is transmitted to the occupants of the car and seriously impairs the saleability of the device.

The cardinal object of this invention therefore has been to provide a telescoping aerial system in which the coacting parts do not rattle against each other to produce the undesirable conditions outlined above. Other objects of the invention will become apparent from the specification and the drawing attached hereto, while the novel features thereof are summarized in the claims.

In said annexed drawing:

Figs. 1, 2 and 3 are respectively longitudinal sections showing my improved telescoping aerial in the completely extended, partially retracted and completely retracted positions;

Fig. 4 shows the anti-rattling member in position on the interior of the coacting telescoping parts;

Fig. 5 is a view of the said anti-rattling means, and

Fig. 6 shows the conical resilient clamping means mounted on the inner end of the inner telescoping member.

It will be apparent that although my invention is described as particularly applied to telescoping automobile aerials, the same may be employed in any telescoping joint construction, as for instance camera tripods.

Referring now to the drawing, 10 designates the hollow outer portion or sleeve of the aerial and at its lower end supports a second sleeve 12. The sleeve 12 adequately reinforces the adjacent end of the sleeve 10 to permit threading the same to accommodate a clamping member 15. This member may be of any configuration desired and is the means by which the aerial 10 is permanently secured to the vehicle body.

The outer end of the sleeve 10 tapers inwardly as at 16 to snugly engage the inner rod portion 18 of the assembled unit. It is at once apparent that, due to the snug fit between the parts, rattling is eliminated in the region of the sleeve portion 16 of restricted internal diameter. As the aerial is telescoped together the rod portion slides past the inwardly tapered region 16 and enters the elongated hollow interior of the outer sleeve. The internal diameter of this sleeve must be considerably greater than the external diameter of the rod 18 to permit economical manufacture in quantity. This differential in diameter results in the objectionable rattling aforementioned.

The rod 18 is retained in any adjusted position with respect to the portion 10 by resilient spring clamping means. As shown in Fig. 6, this comprises a conical or tapering spring member 20 spot welded to the rod 18, as at 21, and provided with a lengthwise extending opening 23. This opening or slot permits the flaring portions of the spring 20, as shown at the right and left side of Fig. 6, to resiliently position themselves against the internal wall of the member 10 to effect the resilient clamping above indicated and also to eliminate any tendency of the parts to rattle, as well as to make electrical contact.

Rattling between the rod 18 and the sleeve 10 is most prevalent when the portions of the aerial are in the position shown in Fig. 3. In this position the rod 18 is supported at one end by the inwardly flaring portion 16 and at the other end by the spring member 20. Thus, although the ends of the telescoped parts do not rattle the midsection of the rod 18, being small in cross-section, may freely bow and slap against the adjacent side of the sleeve.

As shown in Fig. 5, an elongated silencer spring 25 is employed to prevent such rattling between the rod 18 and the sleeve 10. This spring member 25 is preferably made of wire and is coiled at each end, as indicated at 27 and 28, respectively. The coil at 28, as shown in Fig. 4, surrounds and snugly embraces the rod 18 and the coil portion 27 similarly engages the end of the member 18 and the adjacent spring to prevent its movement upwardly past the spring. If desired, this latter coil may at its end be shaped to overlie the adjacent end of the rod 18 to further limit the movement of the silencer spring member 25 upwardly therealong.

The silencer spring 25 is positioned on the rod 18 by placing the straight portion of the said silencer which is adjacent the coil 27 in the slot 23 of the spring 20. This not only prevents interference between the silencer and spring 20, but aids in positioning the coil 27 properly about the rod each time the aerial is telescoped to closed position.

The operation of the silencer spring 25 in combination with the spring 20 and the rod 18 is best shown in Fig. 4. In this figure the solid line showing of the spring member 25 corresponds to Fig. 3. Thus it will be seen that the coil 28 maintains the mid-portion of the rod 18 and outer sleeve 10 separated from each other. This prevents any objectionable bowing of the member 18 with the resultant rattling or slapping.

As the aerial is extended by pulling the rod 18 to the position shown in Fig. 1, the silencer member 25 assumes the dotted line position of Fig. 4 with respect to the rod and thus does not impede extension of the aerial by abutting against the inwardly tapered portion 16 until the aerial is completely extended. As the member 18 is withdrawn from the sleeve 10 the spring 20 engages the coil 28 of the silencer spring member 25 (Fig. 2), and draws it to the position shown in Fig. 1, where the aerial is shown as completely extended.

When the aerial is closed and the sleeve and rod telescoped together the reverse cycle is followed and the spring 20 moves along the interior of the member 10 until the coil portion 27 of the silencer 26 is engaged, as shown in Fig. 4. As the rod 18 is moved on to complete the telescoping, the spring member 25 is carried back to the position shown in Fig. 3, at which time it prevents the aforementioned bowing of the mid-portion of the said rod and subsequent rattling. The straight portion of the spring member 25 will be seen to freely slide in the slot 23 of the spring 20 as the aerial parts are adjustably positioned.

From the foregoing it will be seen that I have provided an improved telescoping connection so supported as to eliminate all objectionable rattling between the parts.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:

1. In a telescoping connection, a fixedly supported member and a second member adapted to telescope therewith and spaced from said fixed member in the telescoping position to provide substantial clearance between the fixed member and the said second member, and a spacing member movable along one of said telescoping members and independently of both members to prevent rattling between the said members, and means to return the spacing member to a rattling preventing position each time the said members are telescoped.

2. In a telescoping connection, a hollow sleeve, a rod adapted to telescope therewith and of such thickness as to provide substantial clearance between the inner sleeve wall and the said rod, an inwardly tapered portion at one end of said sleeve and a resilient member at the inner end of said rod and adapted to maintain in spaced relation the rod and an end of said sleeve and the sleeve and an end of said rod, and a spacing member intermediate the said tapered portion and said resilient member to prevent rattling between the said hollow sleeve and the said rod, said spacing member including an extension adapted to be engaged by the end of said rod each time the connection is telescoped to return the said spacing member to a rattling-preventing position.

3. In a telescoping connection, a hollow sleeve, a rod adapted to telescope therewith and of such thickness as to provide substantial clearance between the inner sleeve wall and the said rod, an inwardly tapered portion at one end of said sleeve to snugly engage the said rod and a slotted resilient spring member at the inner end of said rod and adapted to maintain in spaced relation the rod and an end of said sleeve and the sleeve and an end of said rod, together with an elongated spacing member passing through said slot and engaging the inner end of the rod and surrounding said rod on the opposite side of said spring member to prevent rattling of the parts between the tapered portion of the sleeve and the slotted resilient member.

4. In combination, telescoping members, one of said members being of such transverse dimensions as to provide substantial clearance between it and the other member, and means movable longitudinally relatively to both of said members and adapted to prevent rattling therebetween.

5. In combination, a hollow sleeve, a rod adapted to telescope therewith and of such thickness as to provide substantial clearance between the inner wall of said sleeve and the said rod, and a spacing member movable longitudinally relatively to both said sleeve and rod and adapted to prevent rattling between the rod and sleeve.

6. In a telescoping connection, a hollow sleeve, a rod adapted to telescope therewith and of such thickness as to provide substantial clearance between the inner sleeve wall and the said rod, a spacing member movable along said rod to prevent rattling between the rod and the sleeve, said spacing member having means thereon engageable by said rod, when the rod is telescoped into said sleeve, for automatically positioning said spacing member to prevent rattling.

7. In a telescoping connection, a hollow sleeve, a rod adapted to telescope therewith and of such thickness as to provide substantial clearance between the inner sleeve wall and the said rod, and a spacing member movable relatively to said rod and having a portion which is interposed between the rod and the sleeve when the rod is substantially fully telescoped in said sleeve, whereby to prevent rattling due to bowing of the rod in said sleeve.

8. In telescoping connection, a hollow sleeve, a rod adapted to pass through an open end thereof and telescope therewith and of such thickness as to provide substantial clearance between the inner sleeve wall and said rod, an elongated spacing member interposed between the rod and sleeve and adapted to fill the space between said rod and said sleeve intermediate the mid-section of said rod when the rod and sleeve are telescoped to prevent rattling due to bowing of the rod in the sleeve and means engaging the end of said member remote from said sleeve open end to retain said member in position when said sleeve and rod are telescoped.

9. In a telescoping connection, a hollow sleeve, a rod adapted to pass through an open end thereof and telescope therewith and of such thickness as to provide substantial clearance between the inner sleeve wall and said rod, an elongated spacing member interposed between the rod and sleeve and adapted at one part thereof to fill the space between said rod and said sleeve intermediate the mid-section of said rod when the rod and sleeve are telescoped to prevent rattling due to bowing of the rod in the sleeve and means engaging an end of said member remote from the said one part thereof to retain said member in position when said sleeve and rod are telescoped.

ARTHUR T. MACE.